United States Patent
Wang et al.

(10) Patent No.: US 7,755,276 B2
(45) Date of Patent: Jul. 13, 2010

(54) ALUMINATE-BASED GREEN PHOSPHORS

(75) Inventors: Ning Wang, Martinez, CA (US); Yi Dong, Tracy, CA (US); Shifan Cheng, Dublin, CA (US); Yi-Qun Li, Danville, CA (US); Ravilisetty Padmanabha Rao, Cupertino, CA (US)

(73) Assignee: Intematix Corporation, Fremont, CA (US)

( * ) Notice: Subject to any disclaimer, the term of this patent is extended or adjusted under 35 U.S.C. 154(b) by 85 days.

(21) Appl. No.: 11/804,011

(22) Filed: May 15, 2007

(65) Prior Publication Data

US 2008/0018235 A1    Jan. 24, 2008

Related U.S. Application Data

(63) Continuation-in-part of application No. 11/036,914, filed on Jan. 14, 2005, now Pat. No. 7,541,728.

(51) Int. Cl.
*H05B 33/04* (2006.01)
*C09K 11/02* (2006.01)
*C09K 11/72* (2006.01)

(52) U.S. Cl. .............................. 313/503; 252/301.4 R; 252/301.6 R

(58) Field of Classification Search ......... 313/498–512; 252/301.4 R, 301.6 R
See application file for complete search history.

(56) References Cited

U.S. PATENT DOCUMENTS

| | | | |
|---|---|---|---|
| 4,705,986 A | 11/1987 | Iwama et al. | |
| 5,424,006 A | 6/1995 | Murayama et al. | |
| 5,879,586 A | 3/1999 | Kitamura et al. | |
| 6,621,211 B1 | 9/2003 | Srivastava et al. | |
| 6,649,946 B2 | 11/2003 | Bogner et al. | |
| 6,805,600 B2 | 10/2004 | Wang et al. | |
| 6,809,781 B2 | 10/2004 | Setlur et al. | |
| 2002/0009613 A1 | 1/2002 | Mukai et al. | |
| 2003/0075705 A1 | 4/2003 | Wang et al. | |
| 2004/0056990 A1 | 3/2004 | Setlur et al. | |

FOREIGN PATENT DOCUMENTS

| | | |
|---|---|---|
| CN | 1151429A A | 6/1997 |
| EP | 1403355 A1 | 3/2004 |
| EP | 1447853 A1 | 8/2004 |
| KR | 10-1993-0004437 A | 3/1993 |

OTHER PUBLICATIONS

Shinoya, S. (ed.), Yen, W. (ed.); Phosphor Handbook, CRC Press (1999), pp. 393, 418, 419 and 421.
Search Report dated Sep. 21, 2009 for European Application No. 06718983.7, 6 pages.

*Primary Examiner*—Nimeshkumar D. Patel
*Assistant Examiner*—Anne M Hines
(74) *Attorney, Agent, or Firm*—Fliesler Meyer LLP

(57) ABSTRACT

Novel aluminate-based green phosphors are disclosed having the formula $M_{1-x}Eu_xMg_{1-y}Mn_yAl_zO_{[(x+y)+3z/2]}$; where $0.1<x<1.0$; $0.1<y<1.0$; $0.2<x+y<2.0$; and $2 \leq z \leq 14$; wherein M is selected from the group consisting of Ba, Sr, Ca, and Zn; and wherein the phosphor is configured to absorb UV and visible radiation having a wavelength ranging from about 220 to 440 nm, and emit visible green light having a wavelength ranging from about 500 to 550 nm. A novel feature of the present aluminate-based green phosphors is the relatively narrow range of wavelength over which they can be configured to emit; in one embodiment, this range is from about 518 nm to 520 nm. In an alternative embodiment, the phosphor emits visible light with a peak wavelength having a full width at half maximum of less than or equal to about 40 nm in some embodiments, and 80 nm in other embodiments.

26 Claims, 13 Drawing Sheets

ALUMINATE-BASED GREEN PHOSPHORS

REFERENCE TO RELATED APPLICATIONS

This application is a continuation-in-part of U.S. patent application Ser. No. 11/036,914, titled "Display device with aluminate-based green phosphors," filed Jan. 14, 2005, now U.S. Pat. No. 7,541,728, issued Jun. 2, 2009. U.S. patent application Ser. No. 11/036,914 is incorporated herein in its entirety.

BACKGROUND OF THE INVENTION

1. Field of the Invention

Embodiments of the present invention are directed in general to aluminate-based green phosphors. The present embodiments are also directed to the use of these novel phosphors in display applications, such as backlighting in liquid crystal displays, including backlighting provided by cold cathode fluorescent lamps (CCFLs), plasma display panels (PDPs), cathode ray tube displays (CRTs), lighting systems that include compact fluorescent lamps, green and/or white illumination systems, signal lights, pointers, and the like.

2. State of the Art

Embodiments of the present invention are directed to green phosphors, which provide an alternative to the green LED and cold cathode fluorescent lamp (CCFL) based displays used in various lighting applications in the art. Green LEDs have the disadvantage of being notoriously less efficient than their UV, blue, and red LED counterparts, and additionally, emitted radiation from a green LED can exhibit a wavelength shift with increasing temperatures, an undesirable characteristic. A green phosphor used in conjunction with a UV-to-blue light emitting diode that provides the excitation radiation to the phosphor, however, may provide a device that addresses many of the problems of the green LED. Such a device takes advantage of the so-called down-conversion process, where UV to blue light emitted from the LED can be converted to green light via the green phosphor. Specifically, such devices utilizing green phosphors can be capable of providing efficiencies compatible to a blue LED, where "efficiency" refers to the number of photons emitted by the phosphor relative to the number of photons initially provided as excitation energy. Of course, it will be understood by those skilled in the art that excitation of an LED is carried out with electric energy, so in this sense "efficiency" means power conversion.

A particular type of display is based on the cold cathode fluorescent lamp (CCFL). CCFL technology as been applied used as a light source for passive emissive display such as liquid crystal displays (LCD). LCDs are found in a wide variety of products, such as personal computers, televisions, cell phones, personal digital assistants, and mobile navigation systems. To create the red, blue, and green components of white light from a phosphor blend, currently, europium activated yttrium oxide ($Y_2O_3$:Eu) phosphor has been used for the red, europium activated barium magnesium aluminum oxide ($BaMgAl_{10}O_{17}$:Eu) phosphor for the blue, and cerium/terbium activated lanthanum phosphate ($LaPO_4$:Ce,Tb) have been used as the green component of a white spectrum. However, the color purity of $LaPO_4$:Ce,Tb is generally considered to be poor due to terbium's emission in the yellow-green region of the spectrum. What is needed in the art is a green emitting phosphor which will provide high color purity and good color saturation in the green region, as this is particularly suitable particularly for TV applications.

Phosphor researchers discovered that a luminescent material could be made by incorporating a suitable activator into a base material, the latter being typically either an aluminate or silicate with an alkaline earth metal content, and with an activator such as the rare earth europium in a divalent state ($Eu^{2+}$). An early disclosure by H. Lange in U.S. Pat. No. 3,294,699, for example, described a strontium aluminate composition activated with europium (II) oxide, where the amount of the europium oxide added to the strontium aluminate was between about 2 and 8 mol percent. A specific luminescent material was $0.9\ SrO.Al_2O_3.0.03\ EuO$, which was shown to emit light in a broad band spectrum having a peak response in the green region at about 520 nm when excited by the Hg lines at 254 and 365 nm.

Subsequent to this disclosure a number of different europium activated aluminate compositions appeared in the literature. These compositions were described in relation to a number of different end-use applications, but considering the so-called quenching effect that the europium displays in relation to luminescent properties, the amount of the europium that appears in the phosphor compositions has been maintained in the past at relatively low levels.

An illumination system for use as the green light of a traffic light or in automotive display applications has been described in U.S. Pat. No. 6,555,958 to A. M. Srivastava et al. Disclosed in this patent were both silicate and aluminate-based blue-green phosphors, the aluminate-based compositions being generally represented by the formula $AAlO:Eu:^{2+}$, where A comprised at least one of Ba, Sr, or Ca. The preferable composition disclosed in this patent was $AAl_2O_4:Eu^{2+}$, where A comprised at least 50% Ba, preferably at least 80% Ba and 20% or less Sr. When A comprised Ba, the phosphor peak emission wavelength was about 505 nm and the phosphor quantum efficiency was "high." When A comprised Sr, the phosphor peak emission wavelength was about 520 and the phosphor quantum efficiency was "fairly high." Thus, it was disclosed by this patent that A most preferably comprised Ba to obtain a peak wavelength closest to 505 nm and to obtain the highest relative quantum efficiency. Further revealed was that in the alkaline earth aluminate phosphor, the europium activator substitutes on the alkaline earth lattice site, such that the phosphor may be written as $(A_{1-x}Eu_x)Al_2O_4$, where $0<x\leq0.2$. The most preferred phosphor composition was $(Ba_{1-x}Eu_x)Al_2O_4$, where $0<x\leq0.2$. The compositions disclosed in this patent did not contain magnesium or manganese.

An alkaline earth aluminate compound in which the alkaline earth was a magnesium-containing compound containing no fluorine atoms in its molecules was disclosed in U.S. Pat. No. 5,879,586 to K. Kitamura et al. The rare earth components of this phosphor were cerium and terbium, according to the formula $(Ce_{1-w}Tb_w)Mg_xAl_yO_z$, where $0.03\leq w\leq0.6$; $0.8\leq x\leq1.2$; $9\leq y\leq13$; and $15\leq z\leq23$. This terbium containing compound was reported to emit "high-luminance green light," but relative intensities and peak emission wavelengths were not given, and this green light emitting compound did not contain europium as an activating rare earth element. A "high-luminescence blue-green" emitting phosphor based on strontium as the alkaline earth and europium as the activator was expressed by the formula $(Sr_{4(1-w)}Eu_{4w})Al_xO_y$, where $0.1\leq w\leq0.6$; $11\leq x\leq17$; and $20\leq y\leq30$ but again, relative intensities and peak emission wavelengths were not given.

Green phosphors based on thiogallates have been disclosed. In U.S. Pat. No. 6,686,691 to G. O. Mueller et al., a device comprising a green phosphor and a blue LED (the green phosphor absorbing blue light from the blue LED) was disclosed. In one embodiment, the green phosphor was based on a host sulfide material; in other words, a lattice which included sulfide ions. A preferred host sulfide material was a thiogallate such as $SrGa_2S_4$, and when activated by the rare earth europium, the green phosphor $SrGa_2S_4$:Eu demonstrated a spectrum having a luminous equivalent value of about 575 lm/W at a maximum wavelength of about 535 nm. The dopant (rare earth Eu) concentration in the $SrGa_2S_4$ host was preferably from about 2 to 4 mol %. The blue LED providing the excitation radiation to the green phosphor was an (In,Ga)N diode emitting radiation at a wavelength from about 450 to 480 nm.

A similar strontium thiogallate based phosphor used as a backlight for an LCD has been described by C. H. Lowery in published U.S. application 2004/0061810. In this disclosure, the wavelength-converting material selected to absorb light emitted by the active region of the LED die could be either the strontium thiogallate phosphor described above, or a nitridosilicate phosphor. The strontium thiogallate phosphor had a dominant emission wavelength of about 542 nm. The wavelength-converting material absorbed blue light from the LED die either in a region from about 420 to 460 nm, or, in other embodiments, in a region ranging from about 380 to 420 nm. Again, these devices comprising green-emitting phosphors eliminated problems encountered with green LEDs, such as high temperature stability, and temperature-induced variations in color.

U.S. Pat. No. 6,805,814 to T. Ezuhara et al. describe a green light emitting phosphor for use in plasma displays, the phosphor represented by the formula $M^1{}_{1-a}M^2{}_{11-b}Mn_{a+b}O_{18-(a+b)/2}$, where $M^1$ is at least one of La, Y, and Gd, and $M^2$ is at least one of Al and Ga. In cases where the phosphor contains Al (e.g., wherein the phosphor is an aluminate), the alumina has a purity of not less than 99.9%, and a crystal structure of either α alumina or an intermediate alumina such as aluminum hydroxide. The peak emission wavelengths of these green light emitting phosphors was not given. The excitation wavelengths were in the vacuum ultraviolet.

The green phosphors of the prior art suffer from a number of drawbacks: 1) many emit in a wide band spectrum, which, while generally desirable for achieving a higher color rendering in white light illumination sources, is not appropriate for liquid crystal display (LCD) backlighting, plasma display panels (PDPs) and cathode ray tubes (CRTs), 2) the luminescent intensity (e.g., brightness) and conversion efficiency of the prior art green phosphors is less than adequate, 3) they may suffer from a low color purity or/and color saturation, and 4) they often exhibit poor stability when exposed to ionizing radiation and/or moisture. A "wide band spectrum" for the present purposes may be described as a peak in a spectrum demonstrating a full width at half maximum (FWHM) greater than about 80 nm. For display applications, the color space is dependent on the positions of the individual red (R), green (G), and blue (B) components as represented by their color coordinates. To achieve a larger color space, or "wide color gamut display," as it is known in the art, it is desirable to provide a green phosphor that emits at a peak wavelength of about 520 nm, the peak having a FWHM preferably less than about 80 nm, with the bandwidth of the spectrum covering at least some of the turquoise color without sacrificing illumination intensity.

Therefore, what is needed in the art is a green phosphor having color coordinates around the values of x about 0.193 and y about 0.726, a peak emission wavelength around 518 nm wherein the phosphor emits in a narrow wavelength range, and an emission intensity greater than that provided by any known green phosphor in the art. By combining the needed green phosphors with a high efficiency UV and/or blue LED, a color stable and highly efficient green LED may be provided. Also what is needed in the art are phosphors with green emission having a high color purity with color coordinates required by NTSC for display applications such as plasma display panels (PDPs) or liquid crystal displays (LCDs).

SUMMARY OF THE INVENTION

Embodiments of the present invention are directed toward aluminate-based green phosphors having the general formula $M_{1-x}Eu_xMg_{1-y}Mn_yAl_zO_{[(x+y)+3z/2]}$ where $0.1<x<1.0$; $0.1<y<1.0$; $0.2<x+y<2.0$; $2 \leq z \leq 14$; and where M is any of Ba, Sr, Ca, and Zn, or combinations thereof.

The aluminate-based green phosphors of the present embodiments are configured to absorb radiation in a wavelength ranging from about 200 nm to about 420 nm, and emit visible light in the wavelength ranges (among other ranges) of about 500 nm to 550 nm, 515 nm to 530 nm, and 518 nm to 520 mn. These aluminate-based green phosphors may emit visible light with a peak wavelength having a full width at half maximum of less than or equal to about 80 nm.

The aluminate-based green phosphors of the present invention have various aluminate host structures. There may be several aluminate host structures present at the same time in any one phosphor, where the different aluminate structures may be manifested as different phases. In one embodiment, the value of z is about 14, such that the aluminate-based phosphors of the present invention have the formula $M_{1-x}Eu_xMg_{1-y}Mn_yO_{(x+y)}Al_{14}O_{21}$, where $0.1<x<1$; $0<y<1.0$; $0.2<x+y<2.0$; and where M is selected from the group consisting of Ba, Sr, Ca, and Zn, or combinations thereof.

Embodiments of the present invention include visible radiation emitted from the above described phosphors, a green phosphor-based LED comprising the above described phosphor, and a green phosphor-based CCFL also comprising the instant phosphors. Further embodiments include display devices, including RGB backlight displays, televisions, monitors, cell phones, PDAs, navigation displays, games, decorative lights, and signs. The present aluminate-based green phosphors offer advantages to the display industry in general, and to red-blue-green (RGB) backlighting applications in particular, because the power conversion efficiency of a green LED or CCFL based on the present green phosphor are more efficiently matched to that of the red and blue component LEDs and/or the CCFL components of a backlighting system. Additional advantages are that only one green LED is needed in each RGB unit, instead of the two or more green LEDs that are sometimes required in current RGB display backlighting systems.

DETAILED DESCRIPTION OF THE INVENTION

Embodiments of the present invention are directed toward aluminate-based green phosphors that may be used in display applications such as backlighting for liquid crystal displays, including displays using cold cathode fluorescent lamps CCFLs), plasma display panels (PDP's), cathode ray tube (CRT) displays, and general lighting (such as in compact fluorescent lamps). The instant phosphors are particularly useful as the green component of an RGB phosphor set for display applications. Additionally, they are applicable to any isolated green lighting system that might be LED-based, such as those found in decorative lights, signage lights, signal lights and pointers. They may be useful in white light illumination systems as well.

Prior to discussing the chemical nature of the present aluminate-based green phosphors in detail, it may be useful to provide a generalized discussion of how such phosphors may fit into the world of RGB display applications. This may be done schematically by making reference to FIGS. 1A-C, as well as FIG. 2.

Figure 1A:
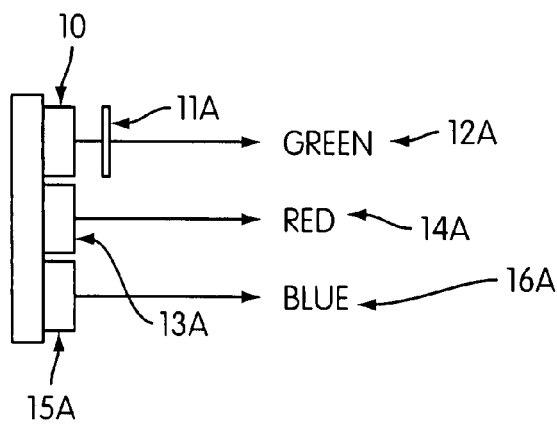
FIG. 1A is a schematic representation of one embodiment of the present illumination system for display applications, wherein a substantially non-visible (200 to 420 nm) LED is used to excite a green phosphor (thus replacing the green LED of the prior art), and wherein the present green phosphor-based LED is configured to substantially match power conversion efficiency with the blue and red LEDs with which they operate.

FIG. 1A is a schematic representation of one embodiment of the present illumination system for display and RGB backlight applications. Referring to FIG. 1A, a (substantially non-visible) ultraviolet (UV) light emitting diode (LED) chip 10, or UV light from a low pressure mercury vapor lamp (LP-MVL), is used to supply excitation radiation to an exemplary aluminate-based green phosphor 11A of the present invention, wherein the UV LED 10 emits light substantially in the non-visible region 200 to 420 nm of the electromagnetic spectrum. Green light 12A is emitted from the phosphor 11A as a result of a wavelength down-conversion of the light absorbed by the phosphor 11A from the UV LED 10. Also shown schematically as part of the display backlighting in FIG. 1A is a red LED chip 13A which emits red light 14A, and a blue LED chip 15A emitting blue light 16A. The purpose of the design of the configuration shown in FIG. 1A, and the choice of the present aluminate-based green phosphor 11A, is to substantially match the light intensity output of the green light 12A contributed to the display with that of the red light 14A and the blue light 16A. In the case of the LPMVL, green emitting phosphor of the present embodiments may also used in conjunction with red and blue emitting phosphors.

Figure 1B:
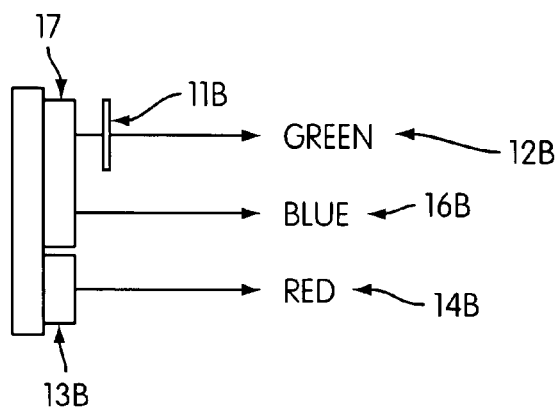
FIG. 1B is a schematic representation of another embodiment of the present illumination system for display applications, this time configured as a visible blue LED to 1) contribute a blue component to the light product of an illumination system, and 2) provide excitation radiation to the green phosphor; this lighting system uses a red LED to supply red light.

FIG. 1B is a schematic representation of another embodiment of the present illumination system in a display application, this time using a (substantially visible) blue LED 17 to excite an aluminate-based green phosphor 11B such that green light 12B contributes to the backlighting portion of the display. The visible blue LED 17 emits light at a wavelength greater than about 420 nm, and in a particular embodiment, at a wavelength of about 450 nm. The novel aluminate-based green phosphor 11B may or not be the same phosphor as the green phosphor 11A shown in FIG. 1A. In some embodiments, the green phosphor 11B may be a silicate-based green phosphor, or combination of silicate and aluminate-based green phosphors. Similar to the previous case, the red light 14A is produced from a red LED 13A.

Figure 1C:
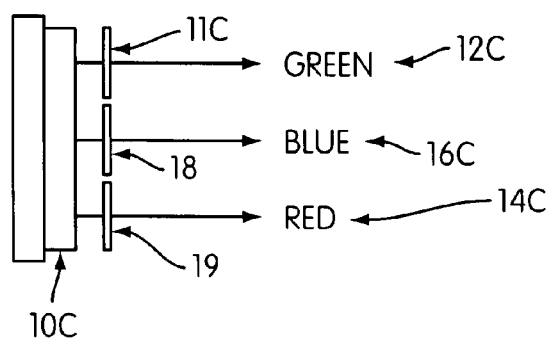
FIG. 1C is a schematic representation of another embodiment of the present illumination system for display applications, this time using the same 200 to 420 nm radiation source to excite three different phosphors, one red, one green, and one blue.

FIG. 1C is a schematic representation of yet another embodiment of the present illumination system for display applications, this time showing a single radiation source to excite three different phosphors. In this case, a UV LED 10C provides the same non-visible 200 to 420 nm radiation to one of the present aluminate-based green phosphors 11C, a blue phosphor 18, and a red phosphor 19. The green phosphor 11C emits green light 12C; the blue phosphor 18C emits blue light 16C, and the red phosphor 19C emits red light 14C.

In each of the configurations represented by the schematic diagrams of FIGS. 1A-C the green light of the backlight display is emitted from a green phosphor, but the manner in which the red light and the blue light is generated varies. In some cases the red and/or blue light may come directly from an LED of the appropriate wavelength; in other cases, the red light and/or blue light may be emitted from a phosphor of the appropriate color.

Figure 2:
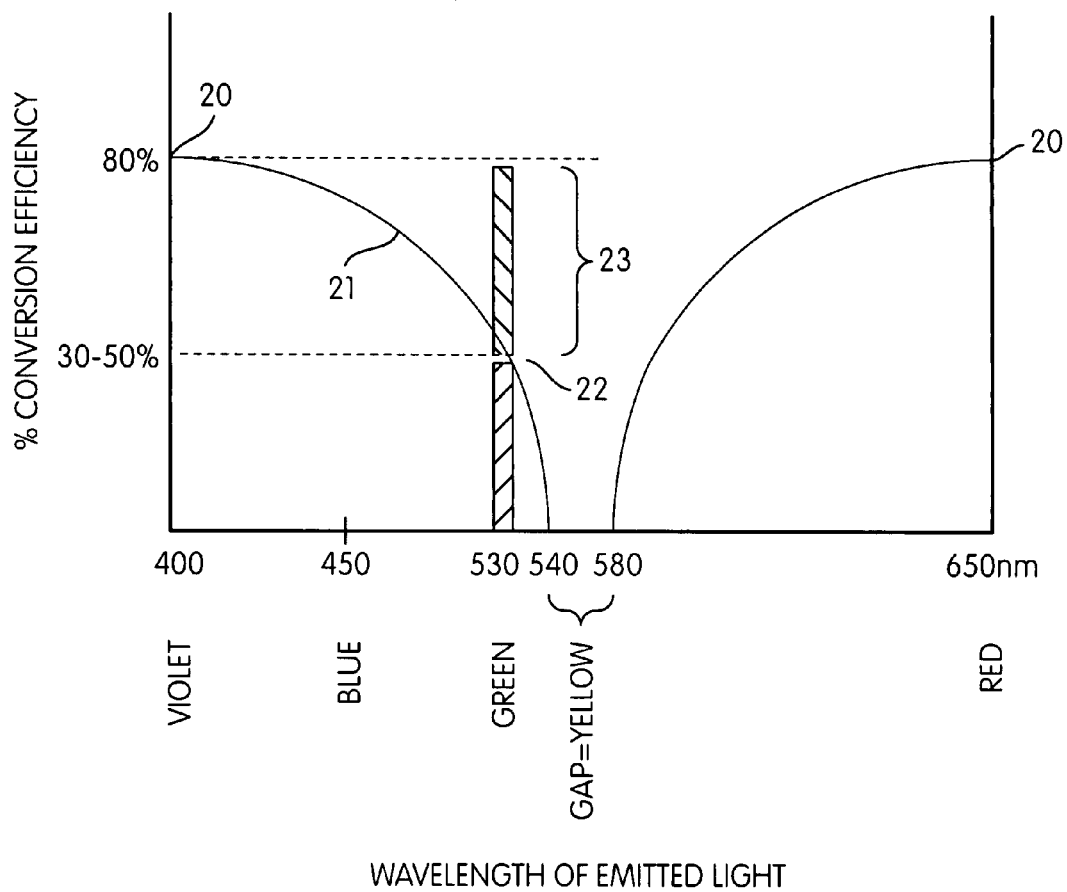
FIG. 2 is a schematic graph of power conversion efficiency of existing LEDs plotted against wavelength, showing how improvements in the power conversion efficiency are possible because the instant green phosphors are able to better match the efficiencies of the red and blue LEDs.

The purpose of providing such configurations as those illustrated in FIGS. 1A-C, each of which employ at least one of the novel aluminate-based green phosphors, may be better understood by referring to FIG. 2. FIG. 2 is a schematic graph of power conversion efficiencies of prior art LEDs and LEDs based on the present green phosphors plotted against the wavelength of the emitted light, showing the improvements relative to the prior art in the power conversion efficiency. With the improved efficiencies, LEDs based on the present green phosphors allow better matching of power conversion efficiencies of the red and blue phosphors and/or red and blue LEDs used in display applications.

Referring to FIG. 2, conversion efficiency has been plotted schematically on the vertical axis, where conversion efficiency is defined herein as the ratio of light emitted relative to electrical power input to the LED. Shown at reference numeral 20 is a typical efficiency of a blue LED, often about 40-50% which is also about the same efficiency that a red LED typically demonstrates. The shape of the curve 21 in FIG. 2, however, shows that the power conversion of an LED decreases dramatically as it is altered to emit in longer wavelengths, in other words, the conversion efficiency decreases as wavelength is increased from the violet at 400 to the blue at 450, then to the green at 530, and finally to the yellow "gap" located at about 550 nm. Thus, the conversion efficiency of prior art green LEDs shown schematically at 22 in FIG. 2 is only about 20% of the efficiency that a typical blue LED achieves.

Stated another way, an improvement in power conversion may be achieved using a green LED with the present green phosphors, and such an improvement is represented by the vertical bar at reference numeral 23. Such an enhancement of power conversion was not previously known in the art. The enhanced power conversions of the present embodiments may be seen with excitation sources comprising a near-UV LED emitting excitation radiation at a wavelength of about 300 to about 410 nm. In one embodiment of the present invention, the green phosphor has a quantum efficiency of about 80% and the near UV LED has a power conversion of about 40-50%; in this embodiment, the green phosphor LED will have a power conversion of 32-40%. This is about double the power conversions of the present GaN based green LED.

There are advantages to the display industry in general, and to RGB backlight applications in particular, had when providing the inventive green phosphor LEDs, because then the power conversion efficiencies of all three red-green-blue (RGB) LEDs are more suitably matched. Additional advantages are that only one green LED is needed in each RGB unit, instead of the two or more green LEDs typically required in RGB display backlighting systems. Additional advantages of using the instant aluminate-based, green emitting phosphors in CCFL applications are higher brightness and better color purity.

Embodiments of the present invention will be described in the following order: first, a general description of the novel aluminate-based phosphor will be presented, with a discussion of the alkaline earths content in the phosphor, and the effect that varying ratios of the alkaline earths have on luminescent properties. In particular, a discussion will be given of the relative amounts of the Mn and alkaline earths M represented by the formula $M_{1-x}Mn_xEuAl_{10}O_{17}$, where M is one or more of Ca, Sr, Ba, and Zn, and combinations thereof. The excitation properties of the present compositions will also be discussed, again for the example where the ratio of Mn and Mg or Mn and Sr is varied, and for the case where the divalent metal may be any of Mn, Ca, Ba, and Zn. Finally, phosphor processing and fabrication methods will be discussed.

The Alkaline Earth Content of the Present Green Phosphors

According to embodiments of the present invention, an aluminate-based green phosphor has the formula $M_{1-x}Eu_xMg_{1-y}Mn_yAl_zO_{[(x+y)+3z/2]}$, where $0.1 < x < 1.0; 0.1 < y < 1.0; 0.2 < x+y < 2.0; 2 \leq z \leq 14$, and M is selected from the group Ba, Sr, Ca, and Zn, or combinations thereof.

According to embodiments of the present invention, an elevated europium content is present for activating the phosphor; that is to say, elevated contents relative to compositions in the prior art, as discussed below. A novel feature of the present aluminate-based green phosphors is that the europium content may be greater than about 0.3 weight percent, where the calculation is made for the europium content as a function of the total weight of the europium to the divalent alkaline earth elements in the composition.

The aluminate-based green phosphors of the present invention are configured to absorb radiation in a wavelength ranging from about 220 nm to 420 nm, and emit visible light having a wavelength ranging from about 500 nm to about 550 nm. In an alternative embodiment, the instant phosphors absorb radiation in a wavelength ranging from about 220 to about 440 nm. In alternative embodiments, the phosphor emits visible light having a peak wavelength ranging from about 515 nm to 530 nm, or in a wavelength ranging from about 518 nm to 520 nm. The present aluminate-based green phosphors have a narrow peak emission wavelength range relative to prior phosphors, the phosphors of the present embodiments emitting visible light with a peak wavelength having a full width at half maximum of less than or equal to about 40 nm in some embodiments, and 80 nm in others.

Figure 3:
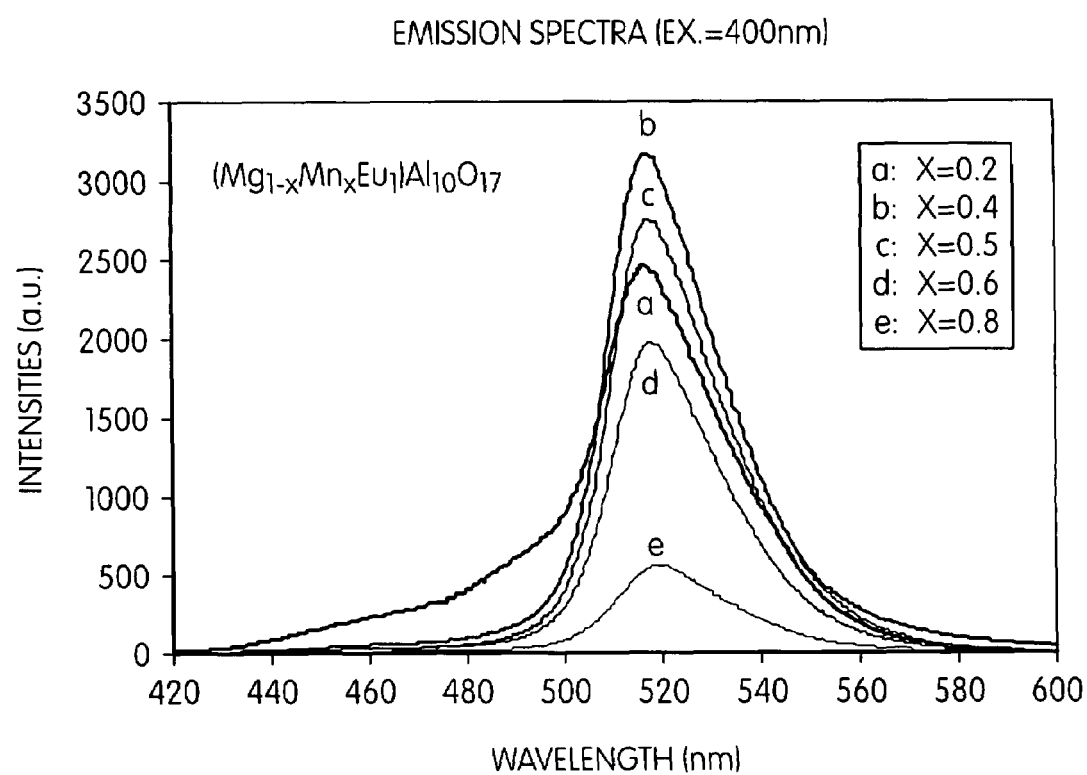
FIG. 3 is an emission spectra of a series of exemplary compositions according to present embodiments, this family having the formula $Mg_{1-x}Mn_xEuAl_{10}O_{17}$, wherein the relative amounts of the Mn and Mg have been varied; the figure showing that the peak emission wavelength of these exemplary compounds is around 520 nm.

The emission spectra of a series of exemplary compositions according to present embodiments is shown in FIG. 3 for the composition $(Mg_{1-x}Mn_xEu_1)Al_{10}O_{17}$, where the relative amounts of the Mn and Mg have been varied to show the effect of the content of these divalent alkaline earth elements. For example, starting with a composition having a relative content of about 20% Mn and 80% Mg (where the percentages represent the amounts of each alkaline earth as a percentage of the total amount of the divalent, alkaline earths present), a composition which displays an emission intensity intermediate in the series, the intensity increases as the relative content of the Mn to Mg is increased first to 50/50, and then to 40/60. This latter composition having a content of 40% Mn and 60% Mg displays the greatest emission intensity of the series. From here, the emission intensity decreases as the Mn content is further increased to 60% Mn and 40% Mg, and then even further still to 80% Mn and 20% Mg. It will be apparent to one skilled in the art that the wavelength of the peak emission for each of these compositions remained centered on a wavelength of about 520, regardless of the ratio of the magnesium to the manganese.

Figure 4A:
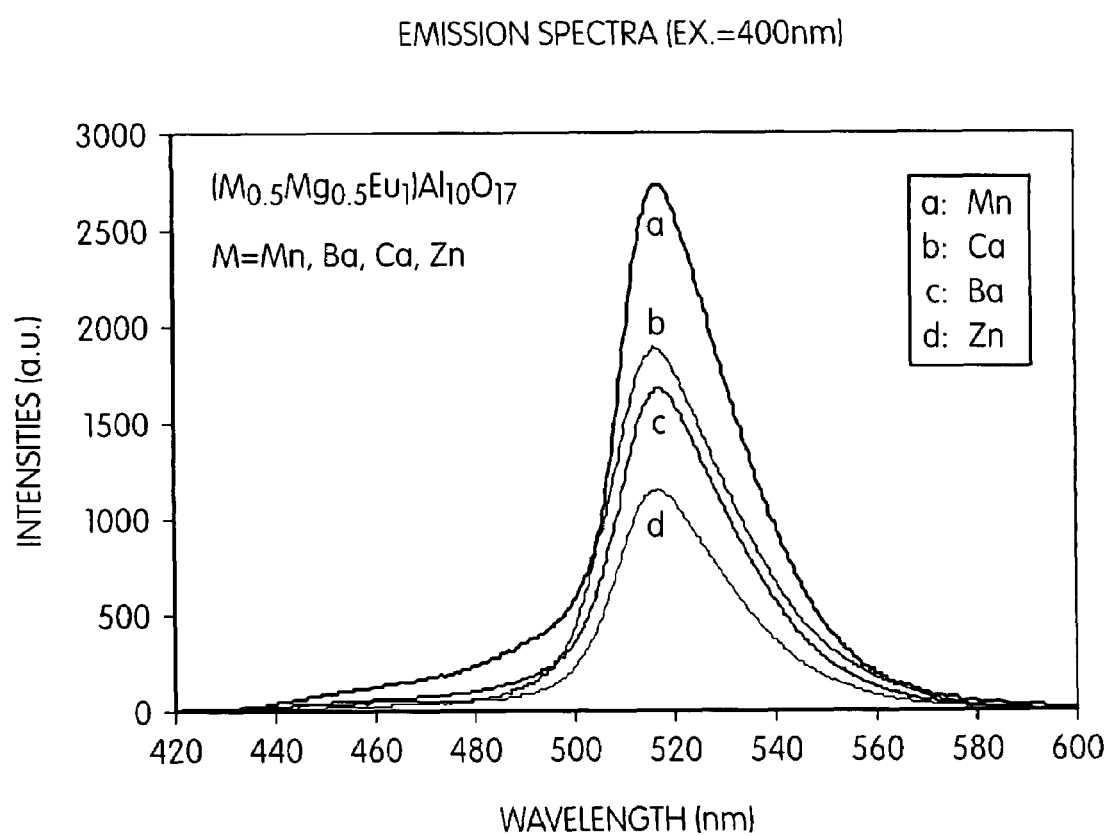
FIG. 4A is an emission spectra with excitation at 400 nm (to contrast with the 254 nm excitation of FIG. 4B) of a series of exemplary compositions represented generally by the formula $M_{0.5}Mg_{0.5}EuAl_{10}O_{17}$; where M is selected from the group consisting of Mn, Ca, Ba, and Zn; the purpose of the graph being to show the effect of combining various divalent alkaline earth elements with Mg.
Figure 4B:
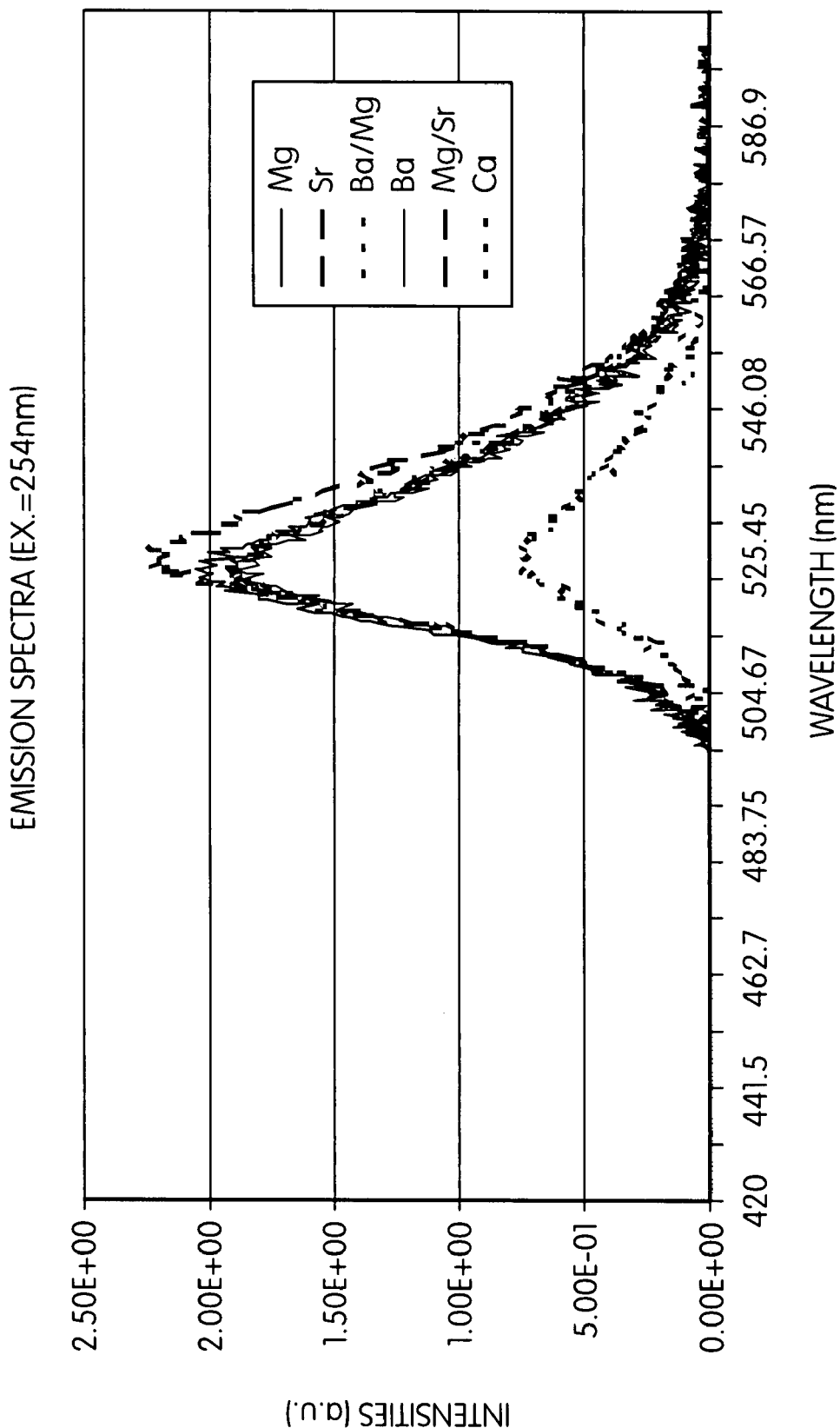
FIG. 4B is an emission spectra with excitation at 254 nm (to contrast with the 400 nm excitation of FIG. 4A) of a series of exemplary compositions represented generally by the formula $M_{0.5}Mg_{0.5}EuAl_{10}O_{17}$; where M is selected from the group consisting of Mg, Sr, Ba/Mg, Ba, Mg/Sr, and Ca; the purpose of the graph being to show the effect of combining Mg with alternative divalent alkaline earth elements.

It will be clear to one skilled in the art that magnesium is an essential component of the present aluminate-based green phosphor compositions. When Mg is in part replaced by by another element in the present phosphors, those elements include the alkaline earths Ca and Ba, and the transition metals Mn and Zn. The results of substituting Ca, Ba, and Zn into the present compositions when the excitation wavelength is about 400 nm are shown in FIG. 4A, where emission spectra were measured of the phosphors represented by the formula $M_{0.5}Mg_{0.5}EuAl_{10}O_{17}$, where M is Mn, Ca, Ba, and Zn, the excitation being 400 nm light. The order of emission intensity for each of the four phosphors started with Mn as the brightest, followed by Ca and then Ba, with Zn having the lowest intensity of the series. The peak emission intensity of all four phosphors was centered on a wavelength of about 520 nm. The results of a similar experiment with M being Mg, Sr, Ba/Mg, Ba, Mg/Sr, Ca and where the excitations was 254 nm is shown in FIG. 4B. At this excitation wavelength, the Mg/Sr combination showed the highest intensity, with the Ca the lowest. The remaining compositions Mg, Mg/Ba, Sr, and Ba were intermediate in emission intensity.

Aluminate Structures of the Present Green Phosphors

The present aluminate-based green phosphors may be based on a variety of different aluminate structures. In one embodiment of the present invention, the novel aluminate-based green phosphor has the formula $M_{1-x}Eu_xMg_{1-y}Mn_yAl_zO_{[(x+y)+3z/2]}$, where z shows the effect of changing the relative content of Al and O, thus influencing the host aluminate structure. In this representation of the formula, the value of z is greater than or equal to about 2, and less than or equal to about 14. Note that this experiment is equivalent to changing the ratio of the aluminum to the divalent, alkaline earth elements.

It will be recognized by those skilled in the art that there are an infinite number of possibilities regarding the value of z, and hence aluminate morphologies, but a range of specific examples will be provided in this disclosure to illuminate the variety of structures that are possible. For example, z may take on the integer values of 2, 4, 6, 8, 10, 12, and 14, but it will be understood that z may take on non-integer values between 2 and 14 as well. The following paragraphs illustrate the aluminate-based green phosphors that may be generated by varying the value of z, with the understanding that only integer values of z are being considered.

For example, an aluminate phosphor may be provided according to embodiments of the present invention where z is equal to 2, such that the phosphor has the formula $M_{1-x}Eu_xMg_{1-y}Mn_yO_{(x+y)}Al_2O_3$ where $0.1<x<1.0$; $0.1<y<1.0$; $0.2<x+y<2.0$; and M is selected from the group consisting of Ba, Sr, Ca, and Zn, and combinations thereof. This phosphor has an aluminate structure different from other embodiments of the present invention.

Alternatively, the present aluminate phosphors may be provided according to embodiments of the present invention where z is equal 4, such that the phosphor has the formula $M_{1-x}Eu_xMg_{1-y}Mn_yO_{(x+y)}Al_4O_6$, where $0.1<x<1.0$; $0.1<y<1.0$; $0.2<x+y<2.0$; and M is selected from the group consisting of Ba, Sr, Ca, and Zn, or combinations thereof. This phosphor has an aluminate structure different from other embodiments of the present invention.

Alternatively, the present aluminate phosphors may be provided according to embodiments of the present invention where z is equal to 6 such that the phosphor has the formula $M_{1-x}Eu_xMg_{1-y}Mn_yO_{(x+y)}Al_6O_9$, and where $0.1<x<1.0$; $0.1<y<1.0$; $0.2<x+y<2.0$; and M is selected from the group consisting of Ba, Sr, Ca, and Zn, or combinations thereof. This phosphor has an aluminate structure different from other embodiments of the present invention.

Alternatively, the present aluminate phosphors may be provided according to embodiments of the present invention where z is equal to 8 such that the phosphor has the formula $M_{1-x}Eu_xMg_{1-y}Mn_yO_{(x+y)}Al_8O_{12}$, where $0.1<x<1.0$; $0.1<y<1.0$; $0.2<x+y<2.0$; and M is selected from the group consisting of Ba, Sr, Ca, and Zn, or combinations thereof. This phosphor has an aluminate structure different from other embodiments of the present invention.

Alternatively, the present aluminate phosphors may be provided according to embodiments of the present invention where z is equal to 10 such that the phosphor has the formula $M_{1-x}Eu_xMg_{1-y}Mn_yO_{(x+y)}Al_{10}O_{15}$, where $0.1<x<1.0$; $0.1<y<1.0$; $0.2<x+y<2.0$; and M is selected from the group consisting of Ba, Sr, Ca, and Zn, or combinations thereof. This phosphor has an aluminate structure different from other embodiments of the present invention.

Alternatively, the present aluminate phosphors may be provided according to embodiments of the present invention where z is equal to 12 such that the phosphor has the formula $M_{1-x}Eu_xMg_{1-y}Mn_yO_{(x+y)}Al_{12}O_{18}$, where $0.1<x<1.0$; $0.1<y<1.0$; $0.2<x+y<2.0$; and M is selected from the group consisting of Ba, Sr, Ca, and Zn, or combinations thereof. This phosphor has an aluminate structure different from other embodiments of the present invention.

Alternatively, the present aluminate phosphors may be provided according to embodiments of the present invention where z is equal to 14 such that the phosphor has the formula $M_{1-x}Eu_xMg_{1-y}Mn_yO_{(x+y)}Al_{14}O_{21}$, where $0.1.0<x<1.0$; $0.1<y<1.0$; $0.2<x+y<2.0$; and M is selected from the group consisting of Ba, Sr, Ca, and Zn, or combinations thereof. This phosphor has an aluminate structure different from other embodiments of the present invention.

Of course, it will be understood by those skilled in the art that any combination of the above aluminate structures may be present in the present green phosphor compositions, and that the value of z in the above structures can take on any value between 2 to 14, inclusive. In other words, y does not have to take on integral values, nor does it have to be constant throughout any one particular phosphor. The value of z may vary within any one grain of the crystal, and it may be substantially constant across grains.

Figure 5A:
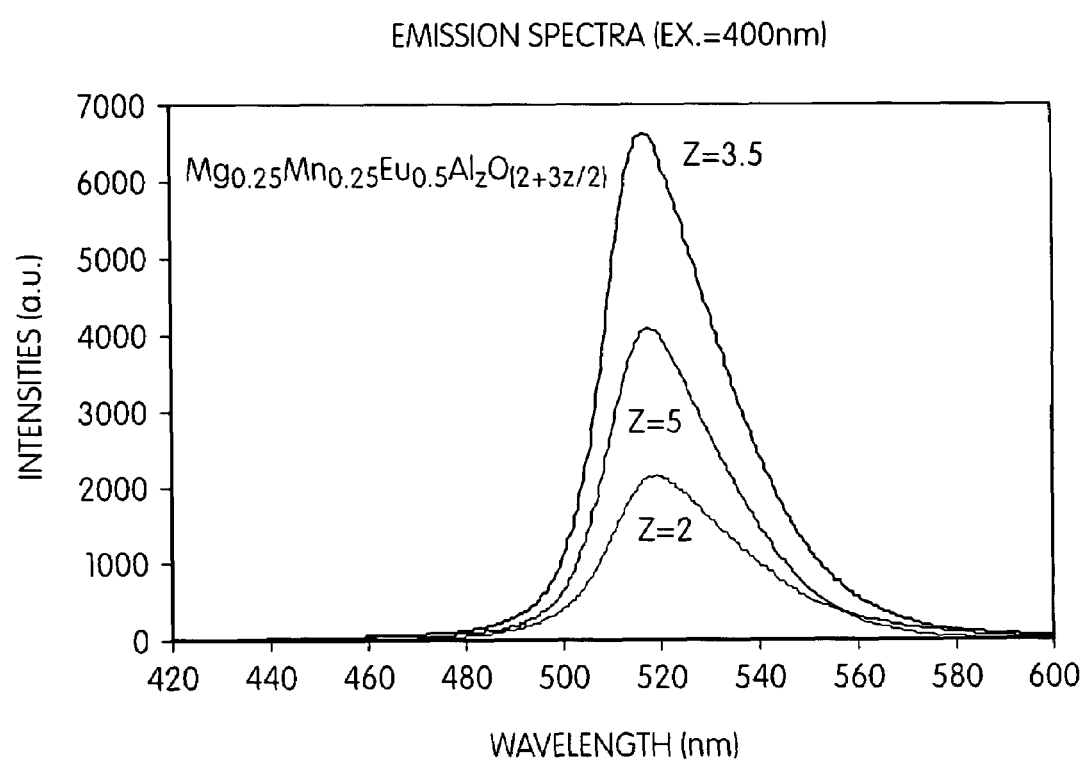
FIG. 5A is an emission spectra of a series of exemplary compositions represented by the formula $Mg_{0.25}Mn_{0.25}Eu_{0.5}Al_zO_{(2+3z/2)}$; plotted for values of z equal to 2, 3.5, and 5, where z shows the effect of changing the relative content of Al and O, thus influencing the host aluminate structure.

An series of emission spectra that show the effect of changing the aluminum content, z, and therefore indirectly the relative content of Al and O and influencing the host aluminate structure, is shown is FIG. 5A. The actual phosphors tested in this series of experiments may be represented by the formula $Mg_{0.25}Mn_{0.25}Eu_{0.5}Al_zO_{(2+3z/2)}$, where compositions having z equal to 2, 3.5, and 5 were synthesized and tested. The data shows that a phosphor having the composition with z equal to 3.5 demonstrated the greatest emission; that with z equal to 2 the lowest with z equal to 5 intermediate.

Figure 5B:
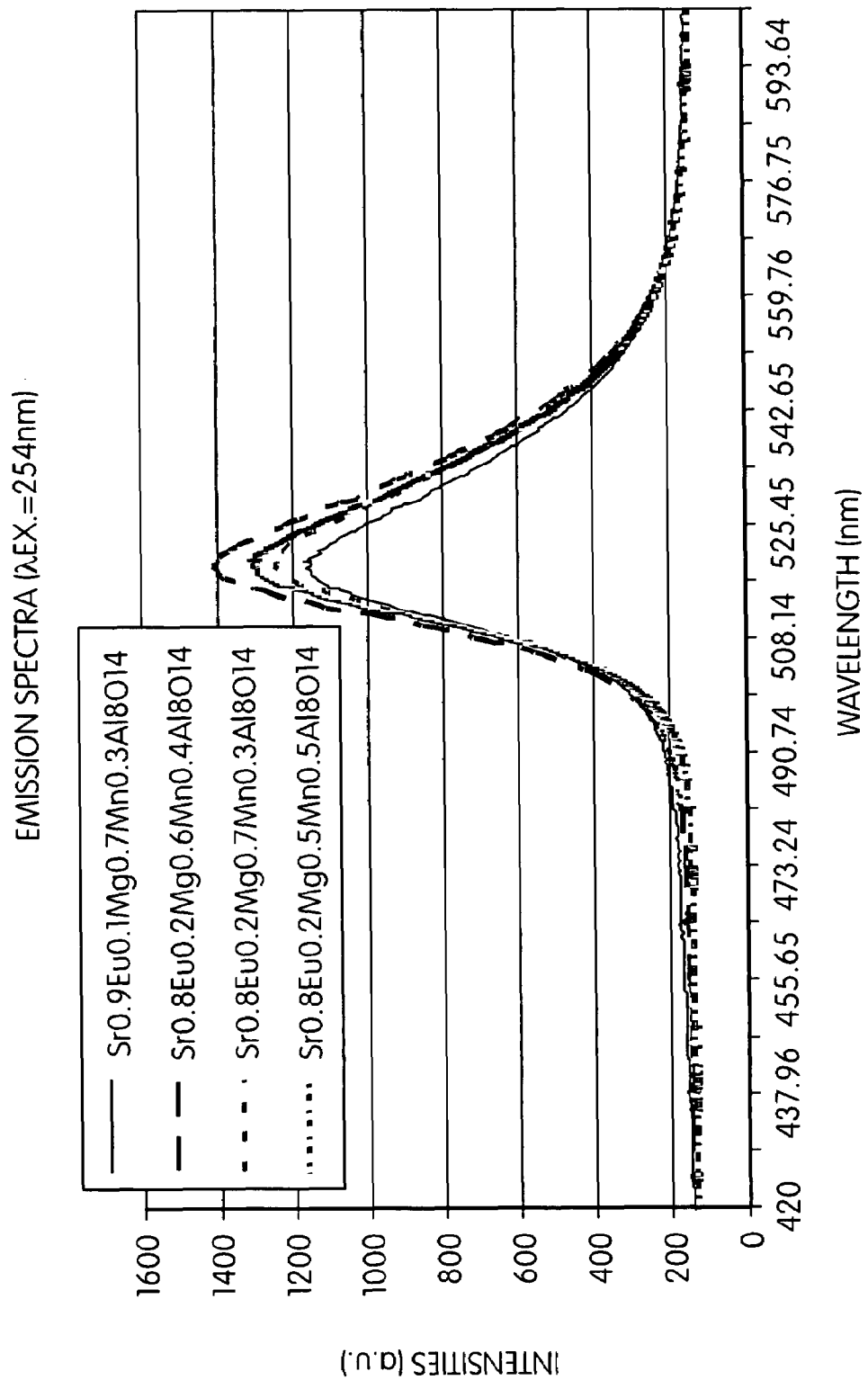
FIG. 5B shows a collection of emission spectra of a series of exemplary compositions represented by generally by the formula $(Sr, Eu)_1(Mn,Mg)_1Al_8O_{14}$, where the relative values of Sr and Eu have been varied keeping their total amount constant; the same for the Mn, Mg pair as well.

To contrast with the data in FIG. 4B for $Al_{10}O_{17}$ aluminate, a series of $Al_8O_{14}$ aluminates was tested with the results shown in FIG. 5B. Here are shown a collection of emission spectra for a series of exemplary compositions represented generally by the formula $(Sr, Eu)_1(Mn,Mg)_1Al_8O_{14}$, where the relative values of Sr and Eu have been varied keeping their total amount constant; and the same for the Mn, Mg pair. Referring again to FIG. 5B, the composition demonstrating the highest intensity was $Sr_{0.8}Eu_{0.2}Mg_{0.6}Mn_{0.4}Al_8O_{14}$, and that with the lowest intensity was $Sr_{0.9}Eu_{0.1}Mg_{0.7}Mn_{0.3}Al_8O_{14}$. Of the two intermediate compostions, that with the second highest intensity was $Sr_{0.8}Eu_{0.2}Mg_{0.5}Mn_{0.5}Al_8O_{14}$, and the third highest was $Sr_{0.8}Eu_{0.2}Mg_{0.7}Mn_{0.3}Al_8O_{14}$.

The Near-UV to Blue LED Radiation Source and Excitation Spectra

In general, the aluminate-based green phosphors of the present embodiments are not particularly responsive to excitation radiation having wavelengths greater than about 420 nm, although silicate-based green phosphors simultaneously developed by the present inventors are responsive. According to the present embodiments, the near-UV to blue light emitting LED emits light that is substantially in the non-visible portion of the electromagnetic spectrum, for example, radiation having a wavelength up to about 420 nm. Such an LED may comprise any semiconductor diode based on a layering of suitable III-V, II-VI, or IV-IV semiconductors whose junctions have an emission wavelength of 420 nm and below. For example, the LED may contain at least one semiconductor layer based on GaN, ZnSe, or SiC semiconductors. The LED may also contain one or more quantum wells in the active region, if desired. Preferably, the LED active region may comprise a p-n junction comprising GaN, AlGaN and/or InGaN semiconductor layers. The p-n junction may be separated by a thin undoped InGaN layer or by one or more InGaN quantum wells. The LED may have an emission wavelength between 300 and 420 nm, preferably between 340 and 405 nm. For example, the LED may have the following wavelengths: 350, 355, 360, 365, 370, 375, 380, 390, or 405 nm.

The near-UV to blue light emitting devices of the present embodiments are herein described generically as an "LED," but it will be understood by those skilled in the art that the source of excitation radiation may be at least one of an LED, a laser diode, a surface emitting laser diode, a resonant cavity light emitting diode, an inorganic electroluminescence device and an organic electroluminescence device, or combinations thereof, where several of the same source, or several different types of sources may be operating simultaneously.

The excitation spectrum of a phosphor is related to the range of wavelengths of light the phosphor is capable of absorbing, which in turn is related to the characteristics of the near-UV to blue LED radiation source. An advantage of the present aluminate-based green phosphors is the wide range of wavelengths over which they are capable of being excited. These concepts are illustrated in FIGS. 6 and 7.

Figure 6:
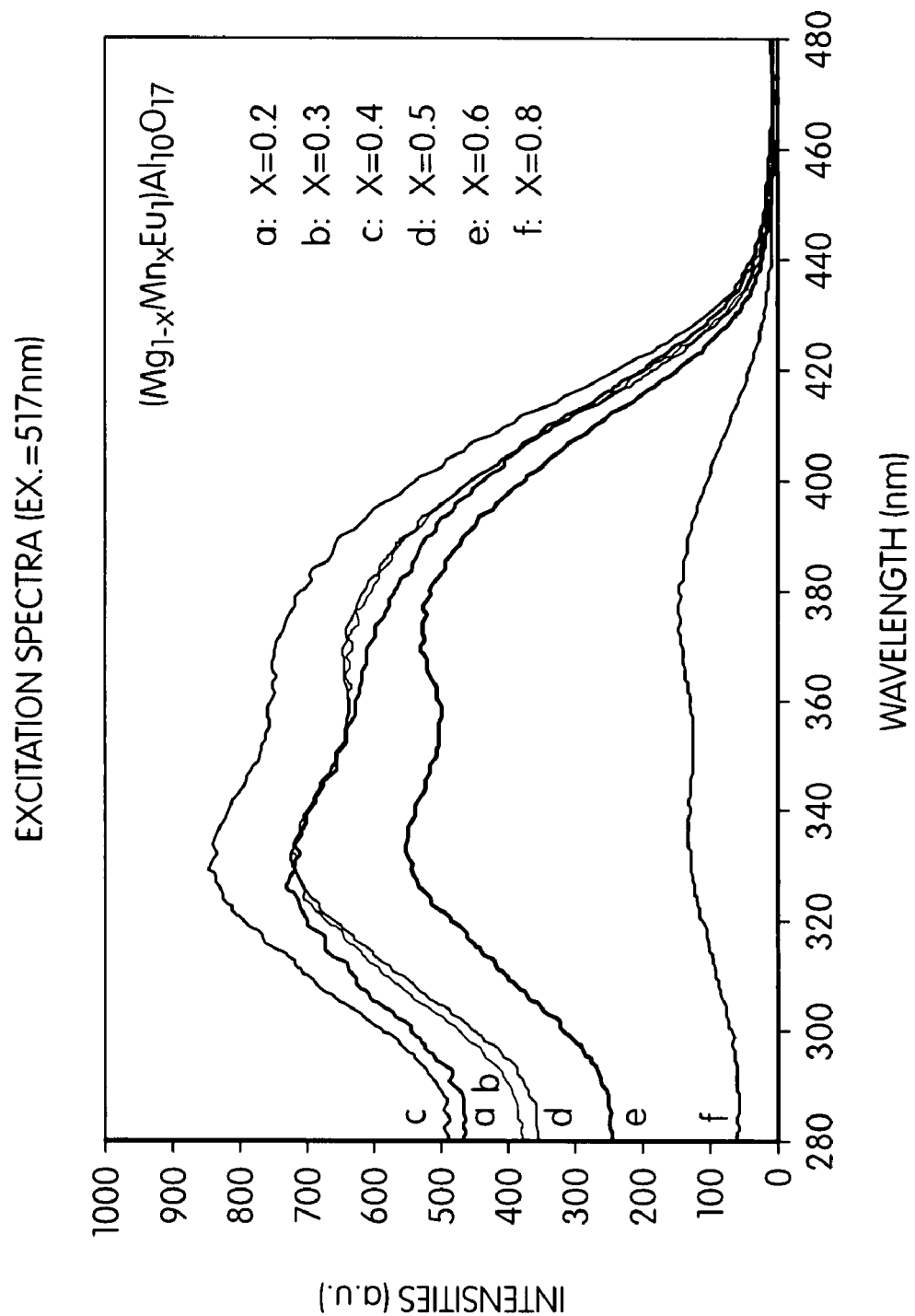
FIG. 6 is an excitation spectra of a series of exemplary compositions represented generally by the formula $(Mg_{1-x}, Mn_xEu_1)Al_{10}O_{17}$, in a 280 to 480 nm wavelength range, where the composition of Mg varies from about 0.2 to about 0.8.

Referring to FIG. 6, the excitation spectra for a series of aluminate-based green phosphors having the formula $Mg_{1-x}Mn_xEuAl_{10}O_{17}$ is shown, for values of x that equal 0.2, 0.3, 0.4, 0.5, 0.6, and 0.8, respectively. It will be observed by one skilled in the art that these phosphors are capable of absorbing radiation between the wavelengths of about 280 and 420 nm, and thus are best suited to be used with a near-UV to blue LED that provides excitation in the non-visible portion of the electromagnetic spectrum. The peak of this absorption occurs at a wavelength of about 320 to 340 nm, although there is significant absorption over a wide range of wavelengths extending from about 320 to about 400 nm. The emission wavelength at which this excitation data was gathered in this experiment was about 517 nm.

The data in FIG. 6 shows that the absorption is highest for a composition having a value x in the formula of about 0.4; in other words, when 40 atomic percent of the divalent alkali metal content was manganese, and the remaining 60 percent magnesium. Absorption was also high (although not quite as high) for compositions with the atomic content of manganese ranging from about 20 to 60 percent.

Figure 7:
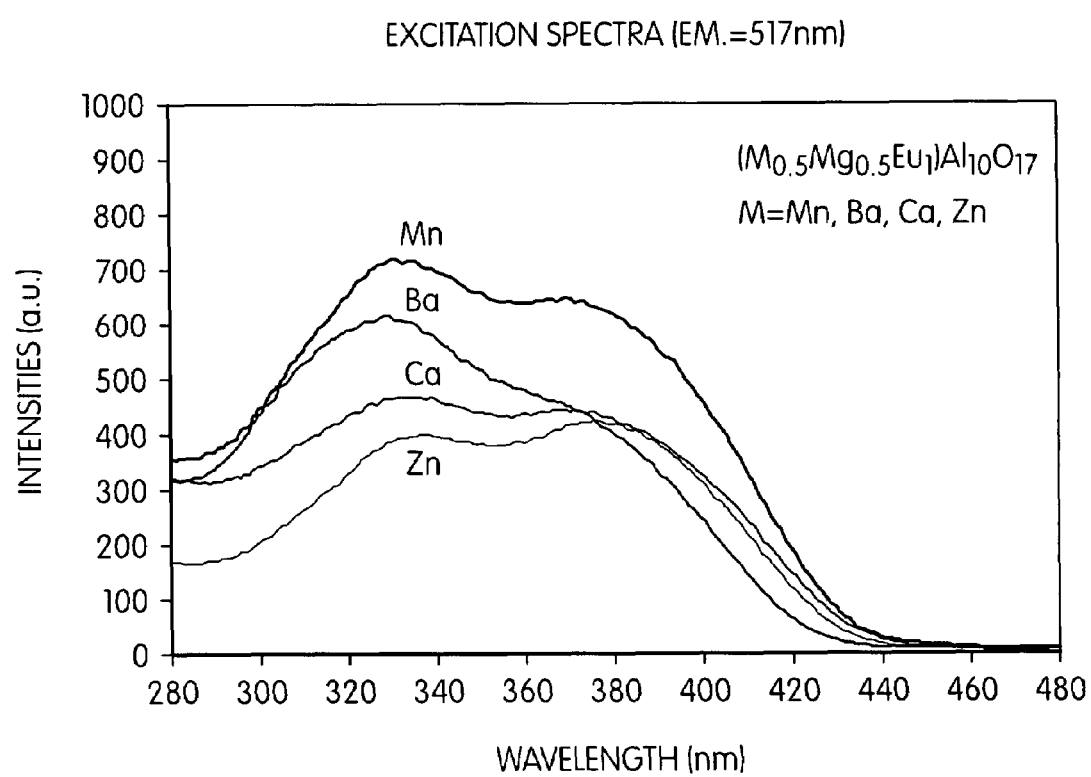
FIG. 7 is an excitation spectra of a series of exemplary compositions represented generally by the formula $(M_{0.5}Mg_{0.5}Eu_1)Al_{10}O_{17}$, in a 280 to 480 nm wavelength range, where M is selected from the group consisting of Mn, Ba, Ca, and Zn.

The effect of varying the divalent cation metal component of the phosphor on absorption, shown indirectly as an excitation spectrum, is shown in FIG. 7 where the divalent metal cation was either an alkali earth element or a transition metal element. This series of phosphors may be described by the general formula $(M_{0.5}Mg_{0.5}Eu_1)Al_{10}O_{17}$, where M was either Mn, Ba, Ca, or Zn. Similar to the series of phosphors tested in FIG. 6, these compositions absorbed substantially non-visible radiation having a wavelength ranging from about 280 to 420 nm, with a peak absorption occurring at wavelengths ranging from about 320 to 400 nm.

The data in FIG. 7 shows that the absorption is highest for a composition having manganese as a divalent metal, so in this case the divalent metal comprises at least in part a divalent transition metal paired with the alkaline earth element magnesium. For a phosphor series of the formula $M_{0.5}Mg_{0.5}Eu_1)Al_{10}O_{17}$, where M is one of Mn, Ba, Ca, and Zn, the absorption decreases after Mn in the order barium, calcium, and then zinc. The wavelength at which the phosphor series emitted light in response to excitation of varying wavelength was 517 nm.

Figure 8:
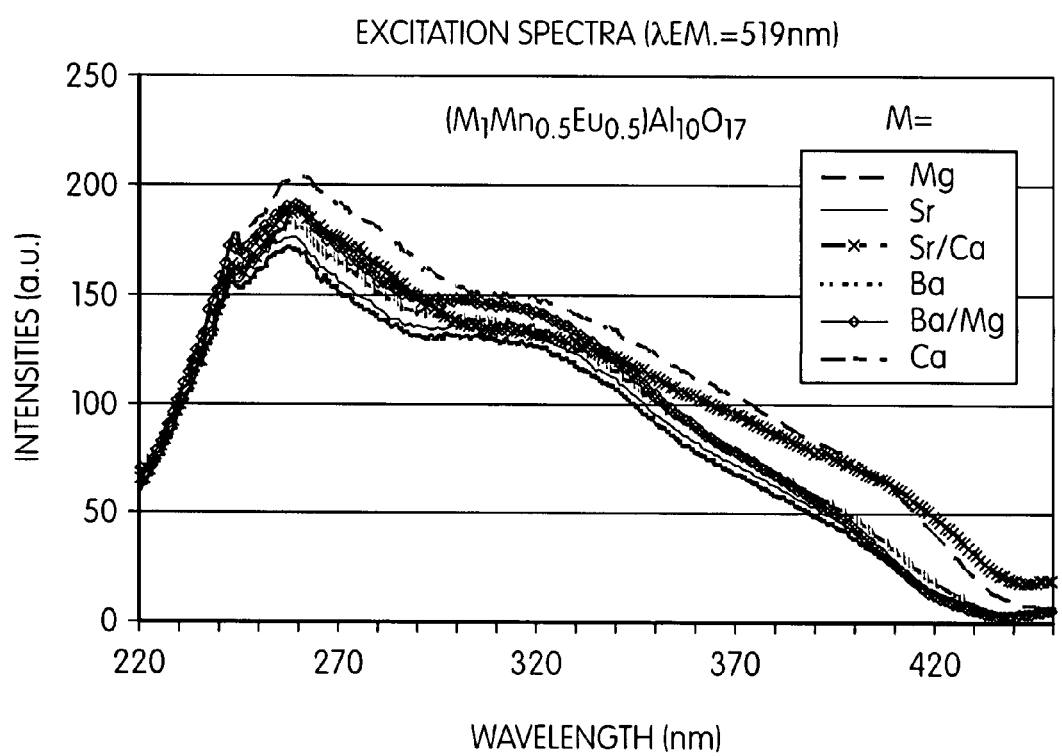
FIG. 8 shows excitation spectra of a series of exemplary compositions represented generally by the formula $M_1Mn_{0.5}EU_{0.5}Al_{10}O_{17}$, wherein: M is at least one of a divalent metal selected from the group consisting of Ba, Sr, Ca, and Mg; excited in 220 to 440 nm wavelength range recorded with emission at 519 nm.

The excitation data in FIG. 8, also measured at 519 nm, shows that the excitation spectra of phosphors in the series $(M_1Mn_{0.5}Eu_{0.5})Al_{10}O_{17}$ each show an emission maximum in an excitation spectra around 260 nm. In this experiment, $M_1$ was any of Mg, Sr, Sr/Ca, Ba, Ba/Mg, or Ca. The wavelength at which these phosphors show the strongest absorption is close to the 254 nm wavelength that corresponds to a low pressure mercury vapor emission. Of the six samples tested, the sample with Mg paired with equal amounts of Mn showed the highest absorption, and since this occurs around 254 nm, this phosphor has excellent potential for CCFL applications.

Figure 9:
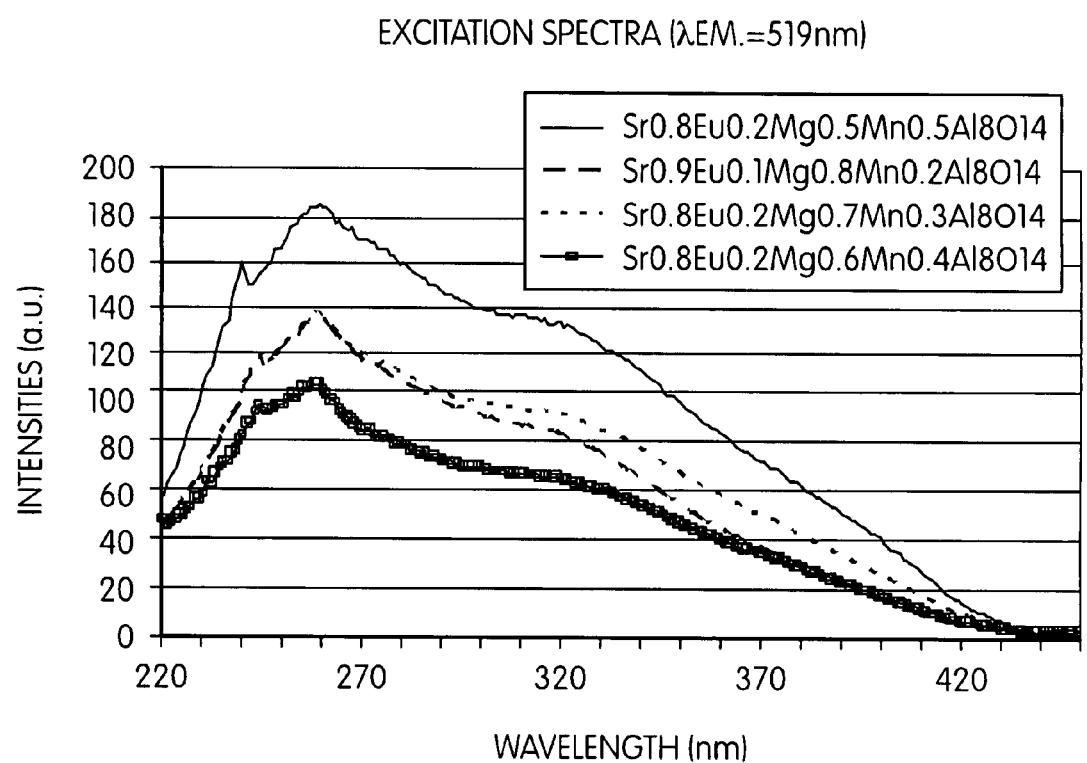
FIG. 9 shows excitation spectra of an exemplary composition represented generally by the formula $MgSrMnEuAl_8O_{14}$, where the phosphor was excited in a 220 to 440 nm wavelength range, the emission intensity recorded at a wavelength of 519 nm.

A final set of optical data is shown in FIG. 9, which is the excitation spectra for a series of phosphors similar to those whose emission spectra was shown in FIG. 5B. The composition with the highest absorption (measured by the strength of the emission at 519 nm as the excitation wavelength is varied), was the phosphor $Sr_{0.8}Eu_{0.2}Mg_{0.5}Mn_{0.5}Al_8O_{14}$. The two phosphors having the compositions $Sr_{0.9}Eu_{0.1}Mg_{0.8}Mn_{0.2}Al_8O_{14}$ and $Sr_{0.8}Eu_{0.2}Mg_{0.7}Mn_{0.3}Al_8O_{14}$ had intermediate absorption, while the phosphor $Sr_{0.8}Eu_{0.2}Mg_{0.6}Mn_{0.4}Al_8O_{14}$ absorbed the least. Again, since the excitation curves prove that peak absorption occurred around the 254 nm wavelength of a low pressure mercury vapor lamp, these aluminate-based green phosphors are well suited for CCFL applications.

White Light LED Illumination Systems

The green phosphors of the present embodiments may comprise part of a white LED system. One or more radiation sources may be employed in such a system. For example, a near-UV or substantially non-visible radiation source may be used to excite the present aluminate-based green phosphors described above, and this same or a second radiation source may be used to excite any of (in combination or alone) a red, blue, blue-green, or yellow phosphor. The second radiation source may be a different a near-UV, substantially non-visible radiation source emitting at about 380 to 420 nm, for exciting any or all of the red, blue, blue-green, or yellow phosphors, or it may be a blue-LED emitting wavelengths 400 nm and longer, again for exciting any or all of the red, blue, blue-green, or yellow phosphors. For example, the second radiation source may emit radiation having a wavelength ranging from about 410 to 500 nm. In any event, the green phosphor is configured to absorb at least a portion of the radiation from a non-visible radiation source and emit light with peak intensity in a wavelength ranging from about 500 to 550 nm.

The yellow phosphors that may be used in such a white light LED illumination system have been described in two previous disclosures by the present inventors. These are U.S. patent application "Novel Phosphor Systems for a White Light Emitting Diode (LED)," filed Aug. 4, 2004 (attorney docket number 034172-011), and U.S. patent application "Novel Silicate-Based Yellow-Green Phosphors," filed Sep. 22, 2004 (attorney docket 034172-014), both of which are incorporated herein by reference. The yellow phosphor is configured to absorb at least a portion of the radiation from the radiation source, and emit light with peak intensity in a wavelength ranging from about 530 to 590 nm.

There are blue and red phosphors known in the art that may be used in conjunction with the present aluminate-based green phosphors to construct white light that may be used in any kind of general illumination application, including RBG backlightlighting displays. Divalent europium activated barium magnesium aluminate (BAM) phosphors may be used in conjunction with the aluminate-based green phosphors of the present invention in RGB backlighting applications. An example of a BAM phosphor that may be used with the present green phosphors is disclosed in U.S. Pat. No. 4,110,660, where a blend containing $BaF_2$, LiF, $Al(OH)_3$, and $Eu_2O_3$ was fired in a hydrogen atmosphere in the temperature range of 1400 to 1650° F. for a period of 3 to 6 hours. Another known blue phosphor which may be used with the present green phosphor has been described in U.S. Pat. No. 4,161,457 to K. Takahashi. This particular phosphor is represented by the formula $aMgO \cdot bBaO \cdot cAl_2O_3 \cdot dEuO$, wherein a, b, c, and d are numbers which satisfy the condition a+b+c+d=10, and wherein $0 < a \leq 2.00$; $0.25 \leq b \leq 2.00$; $6.0 \leq c \leq 8.5$; $0.05 \leq d \leq 0.30$. Of course it will be recognized by those skilled in the art that many other blue phosphor compositions similar to that of K. Takahashi may be used with the present green phosphors.

Other blue phosphors which may be used in conjunction with the present green phosphors in RGB backlighting displays are exemplified by the lanthanum phosphate phosphors that use trivalent Tm as an activator, $Li^+$ and an optional amount of an alkaline earth element as a coactivator, as disclosed by R. P. Rao in U.S. Pat. 6,187,225. Such exemplary blue phosphors may be represented by the formula $(La_{1-x-z}Tm_xLi_yAE_z)PO_4$ where $0.001 \leq x \leq 0.05$; $0.1 \leq y \leq 0.05$; and $0 \leq z \leq 0.05$. More specifically, blue phosphors employing Tm3+ and Li+ doped lanthanum phosphate phosphors, particularly when produced by the sol-gel/xerogel and solid state methods are considered to be a part of the present invention.

In another embodiment, the blue phosphors of the present invention may comprise a compound generally represented by the formula $(Ba_xM_{1-x})_{1-0.25y}Mg_{1-y}Al_{10+y}O_{17+0.25y}$ as a host material, with Eu as an activator, and wherein M represents Ca, Sr, or Ca and Sr. Such a blue phosphor has been described by K. Ono et al. in U.S. Pat. No. 6,576,157, where the stoichiometric amounts of the constituent elements were represented by the relations $0.5 \leq x \leq 1$, and $0.05 \leq y \leq 0.15$, and where the phosphor was excited by vacuum ultraviolet radiation.

Multiphase structured $Eu^{2+}$ activated La, Mg aluminate phosphors have been prepared. U.S. Pat. No. 4,249,108 reveals that the starting materials $La_2O_3$, MgO, $Al(OH)_3$, and $Eu_2O_3$ may be fired at about 1500 to 1650° C. for about 1 to 5 hours in a reducing atmosphere. Additional blue phosphors that may be used with the present green phosphors include those disclosed in U.S. Pat. No. 5,611,959, where aluminate phosphors were taught comprising at least one element selected from the group consisting of Ba, Sr, and Ca; a Eu activator; Mg and/or Zn; and optionally Mn. This phosphor may be prepared by firing the respective oxides and/or hydroxides in a reducing atmosphere at a temperature of 1200 to 1700° C. over a period of 2 to 40 hours.

The red phosphor may be selected from the group consisting of $CaS:Eu^{2+}$, $SrS:Eu^{+2}$, $MgO*MgF*GeO:Mn^{4+}$, and $M_xSi_yN_z:Eu^{+2}$, where M is selected from the group consisting of Ca, Sr, Ba, and Zn; $Z=\frac{2}{3}x+\frac{4}{3}y$, and wherein the red phosphor is configured to absorb at least a portion of the radiation from the radiation source and emit light with peak intensity in a wavelength ranging from about 590 to 690 nm.

Cold Cathode Fluorescent Lamp Based Backlighting Display

The aluminate-based green phosphors of present embodiments may comprise part of a trichromatic phosphor blend providing red, green, and blue components to the backlighting portion of the display. Along with the instant green phosphors are blue emitting, divalent europium activated, barium magnesium aluminate or alkaline earth halophosphates, or in fact any UV excitable blue phosphor. In this context, "UV excitable" means, among other things, a phosphor capable of absorbing and being excited by either the 254 nm or the 365 nm from light from Hg vapor lamp. The red emitting phosphor may comprise a trivalent europium activated rare earth oxide, such as a lanthanum, yttrium and/or gadolinium oxide.

Currently, trivalent terbium and cerium activated lanthanum phosphates and alkaline earth aluminates are used in CCFL technologies to provide the green component of the backlight, the green component used in conjunction with the above mentioned blue and red phosphors. However, he color purity with this type of system is poor because of a terbium emission line in the yellow region of the spectrum. The brightness of these prior systems is also low when compared to the brightness of a CCFL system using the instant green phosphors.

Phosphor Fabrication Processes

Methods of fabricating the novel aluminate-based phosphors of the present embodiments are not limited to any one fabrication method, but may, for example, be fabricated in a three step process that includes: 1) blending starting materials, 2) firing the starting material mix, and 3) various processes to be performed on the fired material, including pulverizing and drying. The starting materials may comprise various kinds of powders, such as alkaline earth metal compounds, aluminum compounds, and europium compounds. Examples of the alkaline earth metal compounds include alkaline earth metal carbonates, nitrates, hydroxides, oxides, oxalates, and halides. Examples of aluminum-containing compounds include its nitrates, fluorides and oxides. Examples of europium compounds include europium oxide, europium fluoride, and europium chloride.

The starting materials are blended in a manner such that the desired final composition is achieved. In one embodiment, for example, the alkaline-earth, aluminum-containing compounds (and/or gallium), and europium compounds are bended in the appropriate ratios, and then fired to achieve the desired composition. The blended starting materials are fired in a second step, and to enhance the reactivity of the blended materials (at any or various stages of the firing), a flux may be used. The flux may comprise various kinds of halides and boron compounds, examples of which include strontium fluoride, barium fluoride, calcium fluoride, europium fluoride, ammonium fluoride, lithium fluoride, sodium fluoride, potassium fluoride, strontium chloride, barium chloride, calcium chloride, europium chloride, ammonium chloride, lithium chloride, sodium chloride, potassium chloride, and combinations thereof. Examples of boron-containing flux compounds include boric acid, boric oxide, strontium borate, barium borate, and calcium borate.

In some embodiments, the flux compound is used in amounts where the number of mole percent ranges from between about 0.01 to 0.2 mole percent, where values may typically range from about 0.01 to 0.1 mole percent, both inclusive.

Various techniques for mixing the starting materials (with or without the flux) include using a mortar and pestle, mixing with a ball mill, mixing using a V-shaped mixer, mixing using a cross rotary mixer, mixing using a jet mill and mixing using an agitator. The starting materials may be either dry mixed or wet mixed, where dry mixing refers to mixing without using a solvent. Solvents that may be used in a wet mixing process include water or an organic solvent, where the organic solvent may be either methanol or ethanol.

The mix of starting materials may be fired by numerous techniques known in the art. A heater such as an electric furnace or gas furnace may be used for the firing. The heater is not limited to any particular type, as long as the starting material mix is fired at the desired temperature for the desired length of time. In some embodiments, firing temperatures may range from about 800 to 1600° C. The firing time may range from about 0.1 to 100 hours. The firing atmosphere may be selected from among air, a low-pressure atmosphere, a vacuum, an inert-gas atmosphere, a nitrogen atmosphere, an oxygen atmosphere, an oxidizing atmosphere, and/or the compositions may be fired in a reducing atmosphere at 100 to 1600° C. for about 2 to 10 hours.

One method of preparing an aluminate-based green phosphor is directed to preparing a green phosphor having the formula $M_{1-x}Eu_xMg_{1-y}Mn_yO_{(x+y)}Al_2O_3$, where $0.1<x<1.0$; $0.1<y<1.0$; $0.2<x+y<2.0$; and where M is selected from the group consisting of Ba, Sr, Ca, and Zn, or combinations thereof. The method of preparing the phosphor may be either one of a sol-gel (wet, or liquid) method or a solid reaction (dry) method.

Using the liquid synthesis method as an example, a metal nitrate may be used to provide the divalent metal component, which may either be an alkaline earth metal element or a transition metal element. A metal nitrate may be used to provide as well to provide the aluminum component of the instant aluminate-based green phosphors. The metal nitrate that supplies the divalent metal component may be $Ba(NO_3)_2$, $Mg(NO_3)_2$, $Sr(NO_3)_2$, or $Mn(NO_3)_2$, and the metal nitrate that provides the aluminum may be $Al(NO_3)_3$.

The liquid synthesis method may further comprise the step of using a metal oxide to provide the oxygen component of the aluminate-based green phosphor. An exemplary liquid method comprises the following steps:

a) providing raw materials selected from the group consisting of $Ba(NO_3)_2$, $Mg(NO_3)_2$, $Sr(NO_3)_2$, $Mn(NO_3)_2$, $Al(NO_3)_3$, and $Eu_2O_3$;

b) dissolving the $Eu_2O_3$ in a 20% nitric acid solution, and then mixing a desired amount of the metal nitrates to form an aqueous-based nitrate solution;

c) adding ammonium to the nitrate solution, and adjusting the pH of the nitrate solution to a value of about 8;

d) heating the solution of step c) to form a gel;

e) heating the gel of step d) to about 700° C. to decompose the nitrate mixture to an oxide mixture;

f) mixing the oxide mixture of step e) with about 0.05 moles or 6 wt % $AlF_3.3H_2O$ in a ball miller to form a powder;

g) sintering the powder of step f) in an reducing atmosphere ($H_2$ and $N_2$) at 1500° C. for about 6 hours;

h) crushing and/or ball milling the sintered mass to break any agglomerates and clusters;

i) washing ball milled powder is washes with water to remove phosphor dust; and j) separating the phosphor powder into fractions by either filtration or sedimentation and, drying the product at 120 C for several hours.

While the liquid synthesis method offers many advantages, a solid state reaction (which may be termed the "dry method") has also successfully produced the instant aluminate-based green phosphors. In a solid state reaction, metal salts such as the carbonates, halides, nitrates, hydroxides, and oxalates of alkaline earth and transition metals may be used to provide the divalent metal component. The aluminum component may be provided by the oxides, fluorides, or hydroxides of aluminum, along with a flux such as halides of ammonia or alkalis of the aluminate-based green phosphor. Solid state reactions may further comprise the step of incorporating a metal oxide into the reaction mix to provide the oxygen component of the aluminate host.

An example of a dry, solid state reaction method that may be used to synthesize the instant green phosphors comprises the following steps:

a) providing raw materials selected from the group consisting of salts of Ba, Mg, Sr, Mn Al, and Eu;

b) mixing above salts in a suitable mixing equipment along with suitable flux;

c) charging the mixed powder into suitable container such as high grade alumina boat or crucible; and d) heating the mixed matter of step c) to about 1000° C.

From step d) on the steps may be similar (if not identical) to those used for the liquid method, and one performs steps g), h), i) and j) as described above.

Figure 10:
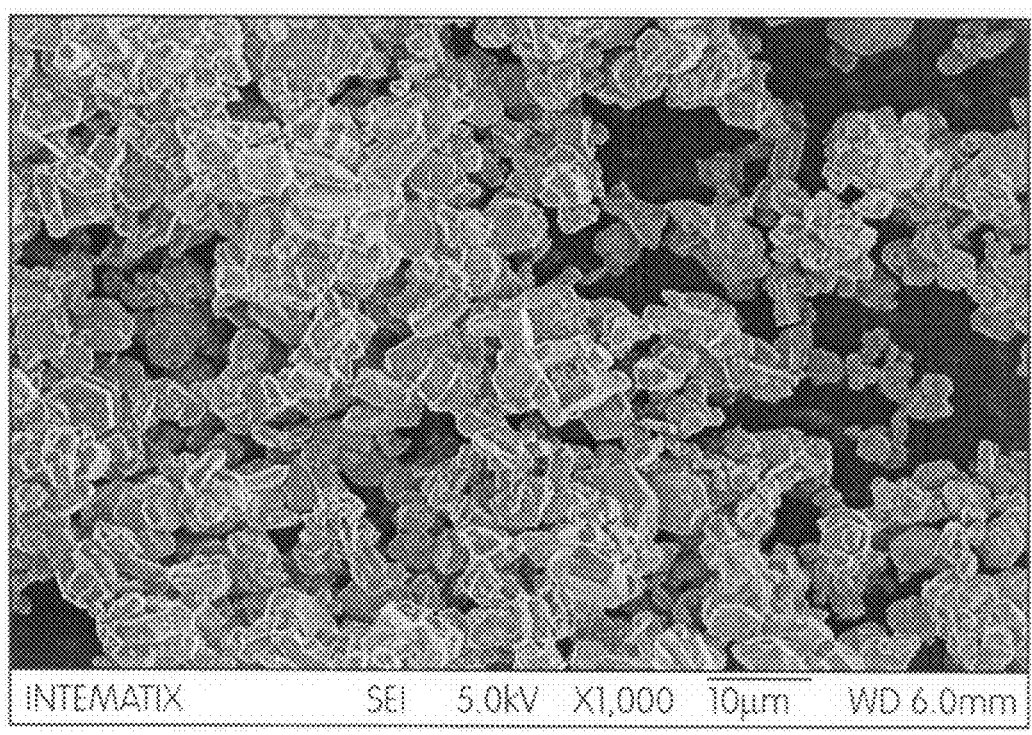
FIG. 10 is an scanning electron micrograph (SEM) the shows the morphology of an aluminate-based green phosphor according to the present embodiments.
Figure 11:
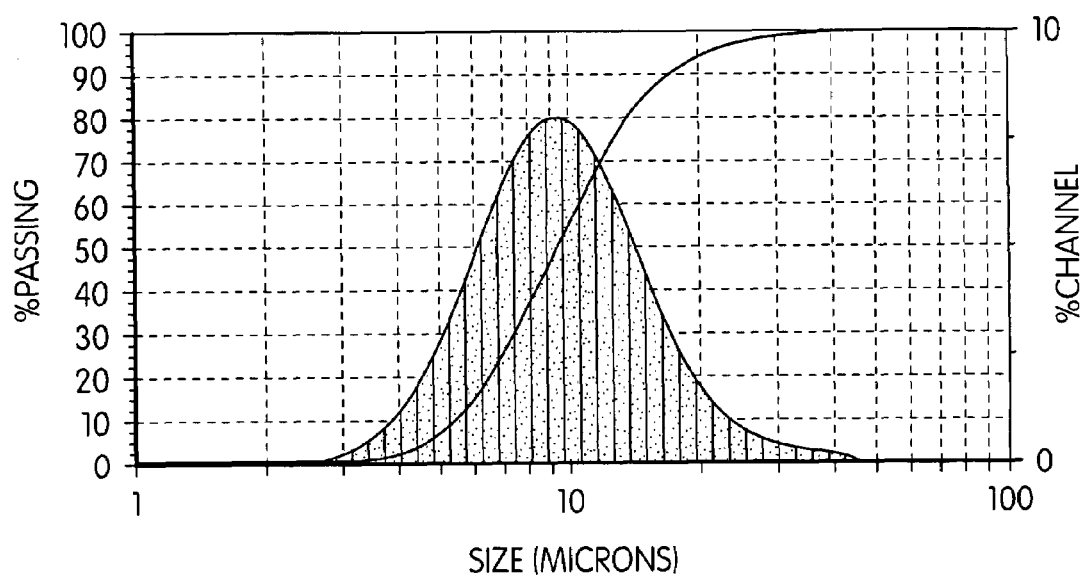
FIG. 11 is particle size distribution (PSD) of an exemplary aluminate-based green phosphor synthesized by solid state reaction method.

An example of the morphology of a material fabricated by the above methods is demonstrated by the scanning electron micrograph of FIG. 10. The phosphor particles of this exemplary aluminate-based green phosphor are well grown crystals displaying an hexagonal structure. The particle size distribution of an aluminate-based green phosphor of the present synthesized by a solid state reaction mechanism is shown in FIG. 11. The particle size at D50 is about 8.5 microns, with a narrow distribution of about 1.5 microns at D5 and 19 microns at D95.

Next, a generalized description of the CIE diagram will be given, along with a description of where the present green phosphors appear on the CIE diagram.

Chromaticity Coordinates, the CIE Diagram, and the CRI

Color quality can be measured by a number of different rating systems. Chromaticity defines color by hue and saturation. CIE is a chromaticity coordinate system developed by the Commission International de l'Eclairage (international commission of illumination). The CIE Chromaticity Coordinates are coordinates that define a color in "1931 CIE" color space. These coordinates are defined as x, y, z, and are ratios of the three standard primary colors X, Y, Z (tristimulus values) in relation to the sum of the three tristimulus values. A CIE chart contains a plot of the x, y, and z ratios of the tristimulus values versus their sum. In the situation where the reduced coordinates x, y, and z add to 1, typically, a two-dimensional CIE (x, y) plot is used.

For the display applications relevant to the present green phosphors, color space is independent of the red, green, and blue light components in terms of their location in color space. The green phosphors of the present embodiments are particularly useful in generating the larger color spaces advantageous for RGB backlighting displays, referred to in the art as "wide color gamut displays." According to one embodiment of the present invention, the aluminate-based green phosphors have color coordinates of about 0.15 to 0.19 for the x-coordinate, and about 0.69 to 0.75 for the y-coordinate. Color coordinates in this range of values clearly have advantages for the display industry.

Many modifications of the exemplary embodiments of the invention disclosed above will readily occur to those skilled in the art. Accordingly, the invention is to be construed as including all structure and methods that fall within the scope of the appended claims.

What is claimed is:

1. An aluminate-based green phosphor having the formula: $M_{1-x}Eu_xMg_{1-y}Mn_yAl_zO_{[(x+y)+3z/2]}$; where
$0.1 < x < 1.0$;
$0.1 < y < 1.0$;
$0.2 < x+y < 2.0$; and
$2 \leq z \leq 14$;
wherein M is selected from the group consisting of Ba, Sr, Ca, and Zn;
and wherein the phosphor is configured to absorb radiation in a wavelength ranging from about 220 nm to about 440 nm, and to emit visible light having a wavelength ranging from about 500 nm to about 550 nm.

2. The aluminate-based green phosphor of claim 1, wherein the radiation it is configured to absorb has a wavelength selected from the group consisting of about 254 nm and about 365 nm, the about 254 nm and about 365 nm radiation originating from a low pressure mercury vapor lamp.

3. The aluminate-based green phosphor of claim 1, wherein the radiation it is configured to absorb wavelength is selected from the group consisting of soft UV radiation having a wavelength ranging from about 320 to about 400 nm, and visible blue radiation having a wavelength ranging from about 400 nm to about 440 nm.

4. The aluminate-based green phosphor of claim 1, wherein the phosphor emits visible light having a peak wavelength ranging from about 515 nm to 530 nm.

5. The aluminate-based green phosphor of claim 1, wherein the phosphor emits visible light with a peak wavelength having a full width at half maximum of less than or equal to about 80 nm.

6. The aluminate-based green phosphor of claim 1 wherein z has the value of about 14, such that the formula of the phosphor is $M_{1-x}Eu_xMg_{1-y}Mn_yAl_{14}O_{[(x+y)+21]}$.

7. The aluminate-based green phosphor of claim 1, wherein the value of y is about 0.75.

8. A green emitting illumination system, the system comprising:
a substantially non-visible radiation source configured to emit radiation having a wavelength ranging from about 220 to 440 nm;
a green phosphor having the formula $M_{1-x}Eu_xMg_{1-y}Mn_yAl_zO_{[(x+y)+3z/2]}$; where
$0.1 < x < 1.0$;
$0.1 < y < 1.0$;
$0.2 < x+y < 2.0$; and
$2 \leq z \leq 14$;
wherein M is selected from the group consisting of Ba, Sr, Ca, and Zn; and wherein the green phosphor configured to absorb at least a portion of the radiation from the radiation source, and emit green light with a peak intensity in a wavelength ranging from about 500 to 550 nm.

9. A display device comprising:
a substantially non-visible radiation source configured to emit radiation having a wavelength ranging from about 220 to 440 nm;
a red light source selected from the group consisting of red phosphors and red LEDs;
a blue light source selected from the group consisting of blue phosphors and blue LEDs; and
a green phosphor having the formula $M_{1-x}Eu_xMg_{1-y}Mn_yAl_zO_{[(x+y)+3z/2]}$; where
$0.1 < x < 1.0$;
$0.1 < y < 1.0$;
$0.2 < x+y < 2.0$; and
$2 \leq z \leq 14$;
wherein M is selected from the group consisting of Ba, Sr, Ca, and Zn; and wherein the green phosphor configured to absorb at least a portion of the radiation from the radiation source, and emit green light with a peak intensity in a wavelength ranging from about 500 to 550 nm.

10. The display device of claim 9, wherein the display device is selected from the group consisting of a backlight for a liquid crystal display (LCD), a television, a monitor, a cell phone, a PDA, a navigation display, a game, a decorative light, and a sign.

11. A white LED comprising:
a radiation source configured to emit radiation having a wavelength ranging from about 410 to 500 nm;
a green phosphor having the formula $M_{1-x}Eu_xMg_{1-y}Mn_yAl_zO_{[(x+y)+3z/2]}$; where
$0.1 < x < 1.0$;
$0.1 < y < 1.0$;
$0.2 < x+y < 2.0$; and
$2 \leq z \leq 14$;
wherein M is selected from the group consisting of Ba, Sr, Ca, and Zn; and wherein the green phosphor configured to absorb at least a portion of the radiation from the radiation source, and emit green light with a peak intensity in a wavelength ranging from about 500 to 550 nm; and
a yellow phosphor configured to absorb at least a portion of the radiation from the radiation source and emit light with peak intensity in a wavelength ranging from about 530 to 590 nm.

12. A white LED comprising:
a radiation source configured to emit radiation having a wavelength ranging from about 410 to 500 nm;
a green phosphor having the formula $M_{1-x}Eu_xMg_{1-y}Mn_yAl_zO_{[(x+y)+3z/2]}$; where
$0.1 < x < 1.0$;
$0.1 < y < 1.0$;
$0.2 < x+y < 2.0$; and
$2 \leq z \leq 14$;
wherein M is selected from the group consisting of Ba, Sr, Ca, and Zn; and wherein the green phosphor configured to absorb at least a portion of the radiation from the radiation source, and emit green light with a peak intensity in a wavelength ranging from about 500 to 550 nm; and
a red phosphor selected from the group consisting of CaS:$Eu^{2+}$, SrS:$Eu^{2+}$, MgO*MgF*GeO:$Mn^{4+}$, and $M_xSi_yN_z$:$Eu^{+2}$, where M is selected from the group consisting of Ca, Sr, Ba, and Zn; $Z=\frac{2}{3}x+\frac{4}{3}y$, wherein the red phosphor is configured to absorb at least a portion of the radiation from the radiation source and emit light with peak intensity in a wavelength ranging from about 590 to 690 nm.

13. A white LED comprising:
a radiation source configured to emit radiation having a wavelength ranging from about 400 to 500 nm;
a green phosphor having the formula $M_{1-x}Eu_xMg_{1-y}Mn_yAl_zO_{[(x+y)+3z/2]}$; where
$0.1 < x < 1.0$;
$0.1 < y < 1.0$;
$0.2 < x+y < 2.0$; and
$2 \leq z \leq 14$;
wherein M is selected from the group consisting of Ba, Sr, Ca, and Zn; and wherein the green phosphor configured to absorb at least a portion of the radiation from the radiation source, and emit green light with a peak intensity in a wavelength ranging from about 500 to 550 nm; and a yellow phosphor configured to absorb at least a portion of the radiation from the radiation source and emit light with peak intensity in a wavelength ranging from about 530 to 590 nm.

14. A white LED comprising:
a radiation source configured to emit radiation having a wavelength ranging from about 410 to 500 nm;
a green phosphor having the formula $M_{1-x}Eu_xMg_{1-y}Mn_yAl_zO_{[(x+y)+3z/2]}$; where
$0.1<x<1.0$;
$0.1<y<1.0$;
$0.2<x+y<2.0$; and
$2 \leq z \leq 14$;
wherein M is selected from the group consisting of Ba, Sr, Ca, and Zn; and wherein the green phosphor configured to absorb at least a portion of the radiation from the radiation source, and emit green light with a peak intensity in a wavelength ranging from about 500 to 550 nm; and
a red phosphor selected from the group consisting of CaS: $Eu^{2+}$, SrS:$Eu^{2+}$, MgO*MgF*GeO:$Mn^{4+}$, and $M_aSi_bN_c$: $Eu^{+2}$, where M is selected from the group consisting of Ca, Sr, Ba, and Zn; c=⅔a+4⁄3b, and wherein the red phosphor is configured to absorb at least a portion of the radiation from the radiation source and emit light with peak intensity in a wavelength ranging from about 590 to 690 nm.

15. A method of preparing an aluminate-based green phosphor having the formula
$M_{1-x}Eu_xMg_{1-y}Mn_yAl_zO_{[(x+y)+3z/2]}$; where
$0.1<x<1.0$;
$0.1<y<1.0$;
$0.2<x+y<2.0$;
$2 \leq z \leq 14$;
wherein M is selected from the group consisting of Ba, Sr, Ca, and Zn; and wherein the method is selected from the group consisting of a sol-gel method and a solid state reaction method.

16. The method of claim 15, further comprising the step of using a metal nitrate to provide the divalent metal component of the green phosphor.

17. The method of claim 16, further comprising the step of using a metal nitrate to provide the aluminum component of the aluminate-based green phosphor.

18. The method of claim 17, wherein the metal nitrate is selected from the group consisting of Ba(NO$_3$)$_2$, Mg(NO$_3$)$_2$, Sr(NO$_3$)$_2$ and Mn(NO$_3$)$_2$.

19. The method of claim 18, wherein the metal nitrate is Al(NO$_3$)$_3$.

20. The method of claim 19, where the metal aluminate is combination of Al(NO$_3$)$_3$ and AlF$_3$.

21. The method of claim 15, wherein the flux is halide or/and borate based salts.

22. The method of claim 15, further comprising the step of using a metal oxide to provide the oxygen component of the aluminate-based green phosphor.

23. A method of preparing an aluminate-based green phosphor having the formula $M_{1-x}Eu_xMg_{1-y}Mn_yAl_zO_{[(x+y)+3z/2]}$; where
$0.1<x<1.0$;
$0.1<y<1.0$;
$0.2<x+y<2.0$; and
$2 \leq z \leq 14$;
wherein M is selected from the group consisting of Ba, Sr, Ca, and Zn; the method comprising the steps of:
a) providing raw materials selected from the group consisting of nitrates, halides or water soluble salts of Ba, Mg, Sr, Ca, Zn, Mn, and Al;
b) dissolving the Eu$_2$O$_3$ in a 20% nitric acid solution, and then mixing a desired amount of the metal salts to form an aqueous-based solution;
c) adding ammonium to the nitrate solution, and adjusting the pH of the solution to a value of about 8;
d) heating the solution of step c) to form a gel;
e) heating the gel of step d) to about 700° C. to decompose the mixture to an oxide mixture;
f) mixing the oxide mixture of step e) with 6 wt % AlF$_3$.3H$_2$O in a ball miller to form a powder;
g) sintering the powder of step f) in an atmosphere comprising H$_2$ and N$_2$, at a temperature of about 1500° C., for about 6 hours;
h) crushing and ball mixing the sintered mass to break the agglomerates and clusters;
i) washing the ball milled powder with DI water; and
j) separating the phosphor powder by filtration or sedimentation, and drying the product at 120° C. for several hours.

24. The method of claim 23, wherein the method produces a particle size of the aluminate-based green phosphor in the range of about 0.1 to about 30.0 microns.

25. The method of claim 23, wherein the method produces a particle size of the aluminate-based green phosphor in the range of about 0.1 to about 30.0 microns.

26. A method of preparing an aluminate-based green phosphor having the formula $M_{1-x}Eu_xMg_{1-y}Mn_yAl_zO_{[(x+y)+3z/2]}$; where
$0.1<x<1.0$;
$0.1<y<1.0$;
$0.2<x+y<2.0$; and
$2 \leq z \leq 14$;
wherein M is selected from the group consisting of Ba, Sr, Ca, and Zn; the method comprising the steps of:
a) providing sources of Ba, Sr, Ca, Zn, Eu, Mg, Mn, and Al from salts from at least one of the salts selected from the group consisting of oxides, carbonates, halides, nitrates, oxalates, and hydroxides;
b) mixing the desired salts from step a);
c) heating the mixed salts from step b) to about 1000° C. to decompose the carbonates, halides, nitrates, oxalates, and hydroxides to an oxide mixture; and
f) sintering the powdered product of step c) in a reducing atmosphere comprising H$_2$.

* * * * *

UNITED STATES PATENT AND TRADEMARK OFFICE
CERTIFICATE OF CORRECTION

| | | |
|---|---|---|
| PATENT NO. | : 7,755,276 B2 | Page 1 of 1 |
| APPLICATION NO. | : 11/804011 | |
| DATED | : July 13, 2010 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 122 days.

Signed and Sealed this
Eighth Day of February, 2011

David J. Kappos
*Director of the United States Patent and Trademark Office*